United States Patent
Fuesting et al.

(10) Patent No.: US 8,012,246 B2
(45) Date of Patent: Sep. 6, 2011

(54) ABSORBENT MOULDED BODIES METHOD FOR PRODUCTION AND USE

(75) Inventors: Bernd Fuesting, Berlin (DE); Peter Muenn, Berlin (DE); Helmut Stach, Prieros (DE)

(73) Assignee: PBB GBR, Berlin (DE)

( * ) Notice: Subject to any disclaimer, the term of this patent is extended or adjusted under 35 U.S.C. 154(b) by 513 days.

(21) Appl. No.: 11/886,212

(22) PCT Filed: Mar. 15, 2006

(86) PCT No.: PCT/EP2006/060763
§ 371 (c)(1),
(2), (4) Date: Jun. 17, 2008

(87) PCT Pub. No.: WO2006/097493
PCT Pub. Date: Sep. 21, 2006

(65) Prior Publication Data
US 2008/0274345 A1    Nov. 6, 2008

(30) Foreign Application Priority Data
Mar. 16, 2005  (DE) .......................... 10 2005 000 022

(51) Int. Cl.
*B01D 53/02* (2006.01)

(52) U.S. Cl. ........................ 96/108; 428/306.6; 264/604

(58) Field of Classification Search .................... 96/108; 428/306.6; 264/604
See application file for complete search history.

(56) References Cited

U.S. PATENT DOCUMENTS

| | | | |
|---|---|---|---|
| 2,768,913 A * | 10/1956 | Hiler | 131/332 |
| 3,108,888 A * | 10/1963 | Bugosh | 501/95.1 |
| 3,973,552 A | 8/1976 | Ervin, Jr. | |
| 4,279,974 A * | 7/1981 | Nishio | 429/104 |
| 5,443,803 A * | 8/1995 | Mizuno et al. | 423/213.2 |
| 5,518,678 A * | 5/1996 | Miyamoto et al. | 264/177.12 |
| 6,432,177 B1 * | 8/2002 | Dallas et al. | 96/132 |
| 2003/0022788 A1 * | 1/2003 | Tanaka et al. | 502/325 |
| 2004/0166035 A1 * | 8/2004 | Noda et al. | 422/180 |
| 2007/0251837 A1 * | 11/2007 | Stach et al. | 206/0.7 |

FOREIGN PATENT DOCUMENTS

| | | |
|---|---|---|
| DE | 3312875 | 11/1984 |
| DE | 3418005 | 11/1985 |
| DE | 3643668 | 5/1988 |
| DE | 4305264 | 8/1994 |
| DE | 4433120 | 3/1995 |

(Continued)

OTHER PUBLICATIONS

Translation of DE 19949638 A1, Apr. 2001, Stach et al.*

(Continued)

*Primary Examiner* — Robert J Hill, Jr.
*Assistant Examiner* — Christopher P Jones
(74) *Attorney, Agent, or Firm* — Jordan and Hamburg LLP

(57) ABSTRACT

The invention relates to an absorbent moulded body, a method for production and use thereof, comprising micro- or meso-porous adsorbents. The moulded bodies serve as process heat and refrigeration sources, whereby a vapour working medium is expelled from the moulded body by the introduction of heat energy and optionally condensed and the working medium, optionally previously vaporised, is absorbed in gaseous form. The moulded body comprises crystalline powder and/or granules together with a conducting surface within a cage, connected to the surface and the powder and/or granules are bonded by the binder in the form of a random bed.

34 Claims, 4 Drawing Sheets

FOREIGN PATENT DOCUMENTS

| | | |
|---|---|---|
| DE | 4437950 | 4/1996 |
| DE | 19734887 | 3/1999 |
| DE | 19949638 A1 * | 4/2001 |
| DE | 10021260 | 10/2001 |
| DE | 10301099 | 7/2004 |
| EP | 0091095 | 10/1983 |
| EP | 0140380 | 5/1985 |

OTHER PUBLICATIONS

Translation of DE10301099 A1, Stach, Jul. 29, 2004.*

* cited by examiner

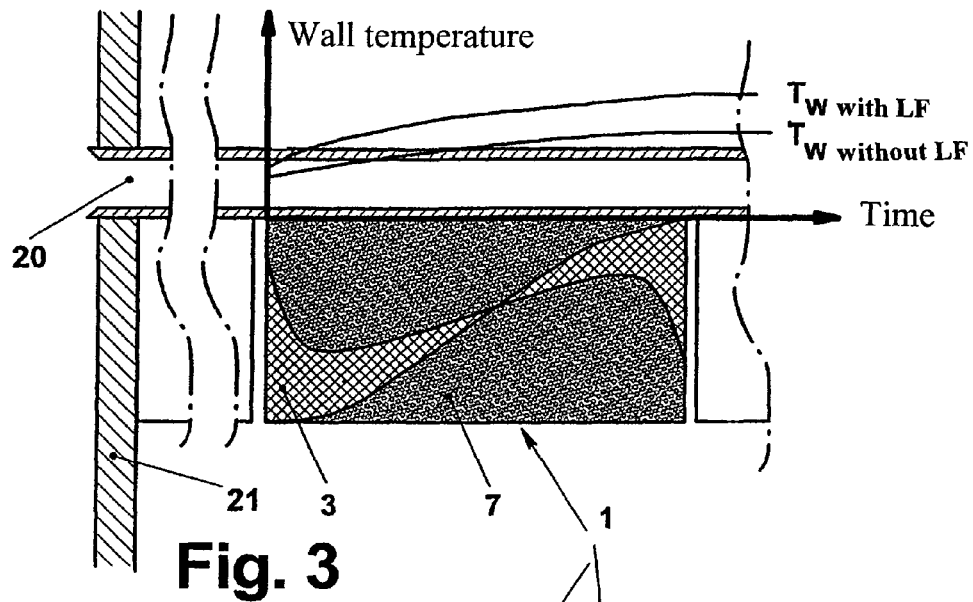
Fig. 3
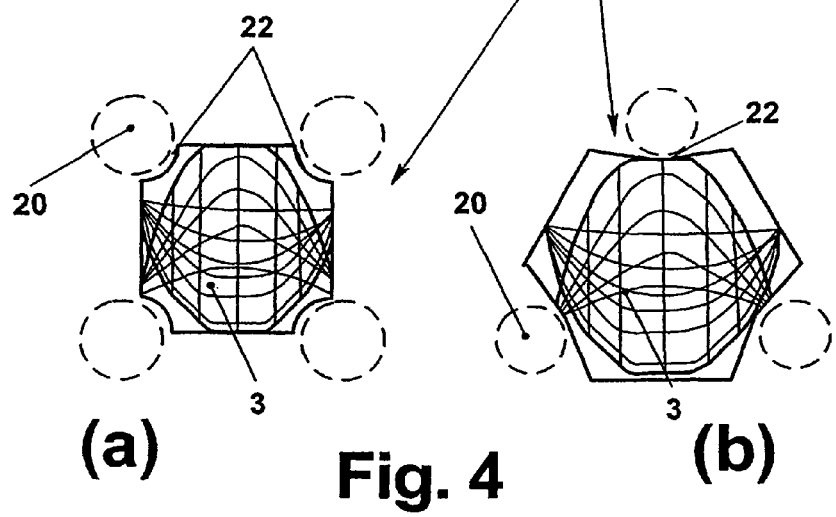
(a) Fig. 4 (b)

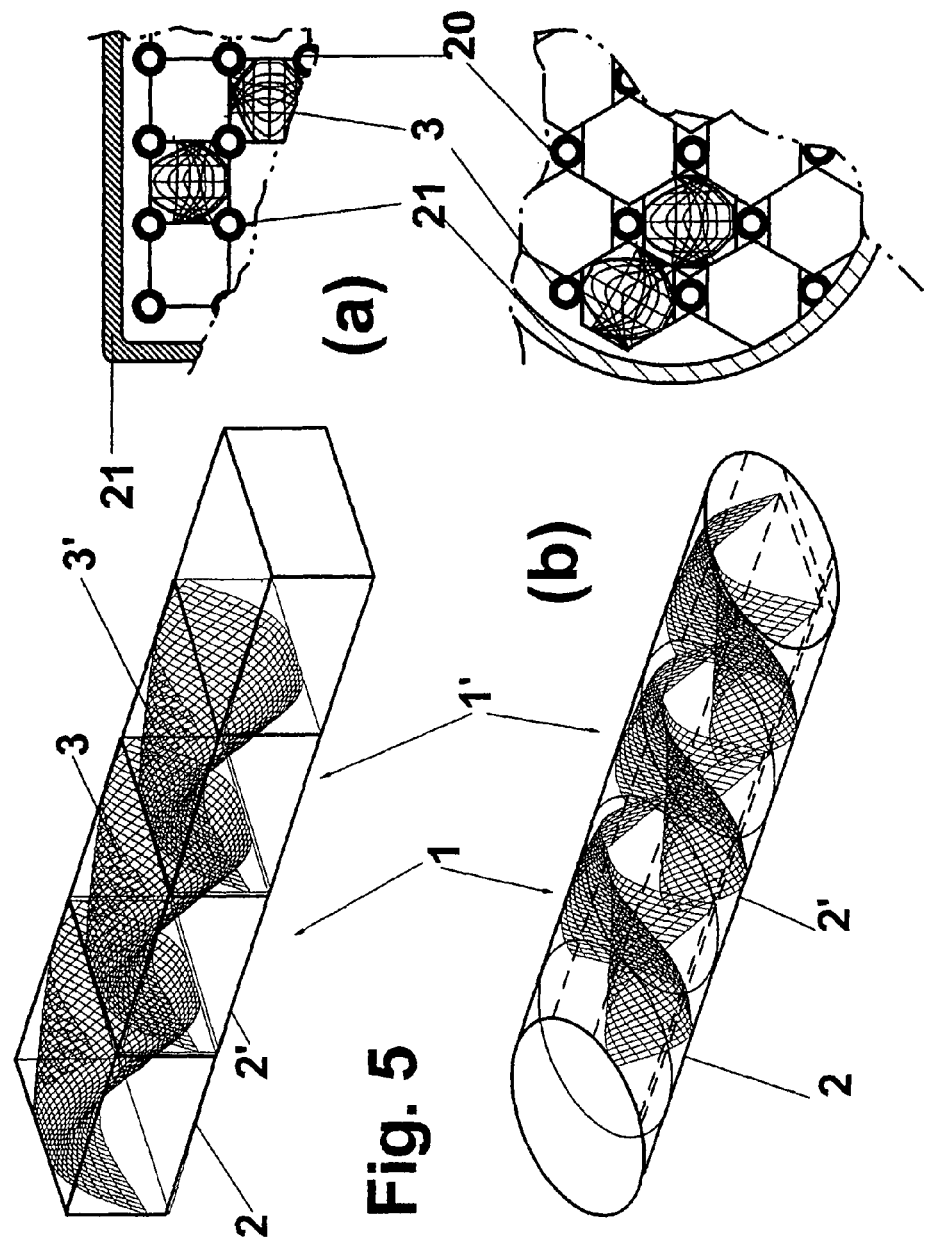

ABSORBENT MOULDED BODIES METHOD FOR PRODUCTION AND USE

BACKGROUND OF THE INVENTION

This invention relates to a sorbent moulded or shaped body comprising micro-porous or meso-porous adsorbents, and a method for production and use thereof. The moulded bodies serve to store process heat and cold, whereby a vaporous working medium is expelled from the moulded body by the introduction of heat energy and the working medium is optionally condensed. The working medium that is optionally previously vaporised is adsorbed in gaseous form.

As a coated, packed or bundled form, moulded bodies provide sorptive thermal energy storage preferably with the help of water vapour working medium as for instance in the fields of heating, cooling/air conditioning, above all for making use of natural thermal sources such as terrestrial or solar heat. With the aim of energy storage, there exist applications everywhere where thermal energy must be available for temporary use periods, which should not coincide with periods of heat generation or with their accessibility. The economical scope of the application of moulded bodies, comprised of micro-porous or meso-porous sorbents, is to obtain higher space-time yields of the apparatus by which the energy transformation, for instance that of heat storage, can be achieved. In this case, the external shape and the geometrical dimensions of the sorbent shaped bodies can be suitably adjusted to the corresponding heat exchanger, such as to the geometry of the internal wall of the heat reservoir.

State of the art in the field of silicate heat storage media is characterised by micro-porous and meso-porous sorbents from which the water of crystallization can be removed through heat input without damaging their framework.

Zeolites

The production of zeolites is described in published information regarding "Baylith®—Informationen", among them "80.100—general product description", "81.503—Technical Properties" and "81.505—Technical application features", Bayer-Werke Leverkusen, as well as on "Zeosorb Molecular Sieves", Bayer AG Bitterfeld-Wolfen.

For the achievement of higher mass and heat space-time yields specially for those processes which can be influenced by catalytic action, alumosilicate like zeolites are mainly employed. They occupy anion frameworks that are preferentially subjected to chemical modification processes (DE 44 33 120 A 1). Usual silicalite sorbents production techniques consist of impregnating a matrix with activating components such as through infiltration process to achieve cation exchange. High heat storage capacity can be acquired through employing magnesium containing zeolite granular materials (DE 33 12 875 A1). Hydrophilic materials such as salt hydrates that are subjected to a reversible hydration will be deposited on usually temperature stable sorbing matrix. Examples are given in DE 43 05 264 A1, in which calcium chloride is placed in a zeolite granulate (DE 43 05 264 A1) or in a silica gel (DE 197 34 887 A1). The chemical composition of a zeolites type NaX is for example $Na_{12}(AlO_2)_{12}(SiO_2)12.zH_2O$, which is mostly consisted of $SiO_4$ and $AlO_4$ tetrahedron. The pore diameter, preferably adjusted with the size of water molecule, lies within 3-10 Å depending on the type of the molecular sieve. Their thermal stability can reach up to a temperature of 850° C. and their hydrothermal stability is up to about 400° C.

In cyclically accomplished processes, such as the charging of heat storage through desorption of the water vapour working medium and its discharging through adsorption on zeolites, not infrequently cycle numbers from 4,000 to 10,000 are attained. However, the almost entirely adsorbed water is only released by zeolites through application of process temperatures of 200° C. to 450° C. Thus, the sorption capacities of zeolites are only partially utilized when solar produced low-temperature thermal heat is used. Zeolites-like metallosilicates exhibit a similar thermal behaviour but it is less efficient.

Metallophosphate: The replacement of silicon by phosphorus ions leads to zeolite-like molecular sieves such as alumina-phosphates (ALPO). A replacement of aluminium by silicon results in silico-alumo-phosphate (SAPO). The chemical composition of ALPO corresponds to a large extent to $xR.Al_2O_3.1.0\pm0.2\ P_2O_5.yH_2O$ The composition of water-free SAPO is about $0-0.3R(Si_x-Al_yP_z)O_2$, wherein R is anine or ammonium salt. The $AlO_4$-tetrahedrons are seated together with $PO_4$-tetrahedrons. In the metallo-alumino-phosphates (MeALPO) of $0-0.3R(Me_x-Al_yP_z)O_2$ composition, silicon is additionally replaced by numerous other elements. Common feature to all metallophosphates is the formation of new structures with outstanding characteristics for water storage. Storage materials whose pore diameter favourably accounts to 2 to 13 Å are mainly selected. Thermal stability even at temperatures up to 1000° C. is exhibited. Their hydrothermal stability for temperatures up to 600° C. is appreciably high. During the sorption smooth hysteresis curves appear. To the state of knowledge through sample tests it is confirmed that with repeated adsorption and desorption up to 60.000 cycles, practically no changes in the isotherm forms of water can be recognized. It is of special advantage that the sorption isotherms of water exhibit an s-form process with an abrupt rise within a very low pressure interval. Within this range through pressure drop to few mbar, an extensive desorption is achieved under normal temperature. In comparison to silica gel, a 4 to 6 times water amount is stored. Metallophosphates are particularly preferred for storage of solar heat due to their low temperature favoured desorption in the device. It is intended to build significantly smaller storage systems and also sorption heat pumps on the basis of the new sorbents due to the high temperature change.

Granules/Moulded Bodies:

Synthetic sorbents that are modified to intended purposes are usually available in a finely grained crystal form. Mostly their crystal size does not exceed a maximum of 500 μm. However, for an effective heat storage application in the apparatus, the bulk of these crystals allow only limited flow-speeds of the vaporous materials due to their limited gap volumes and higher flow resistance. Pelleted granules that are made into porous moulded bodies with binder which bodies are random clusters of the pelleted granules are favourably applicable. These moulded bodies exhibit larger transport pores and cavities as well as flow channels, whereby higher speeds for the flow of the working medium are permitted and upstream distances are significantly shortened for the water vapour working medium mass transfer. The total process-time is limited by the material and heat exchange processes and is determined by the pore size of the sorbents themselves. An advantage of application of moulded bodies is that they are packable between heat directing devices and in the exchangeability of individual components particularly for the purpose of designing and dimension enlargement in module-like arranged heat storage. It seems also possible to limit the requirement of installed heat directing components in the heat storage through enlargement of the moulded bodies. So far there are only the so-called "zeolite moulded bodies" as a standalone category within the outlined state of the art.

Thermal Conductivity

In random bulk sorbents with a high storage capacity, heat energy with low-loss is introduced and transferred into the interior space flowing heat carrier medium, whereby if possible heat energy is not released irreversibly to the environment (e.g. DE 34 18 005 A1, DE 36 43 668 A1, DE 44 37 950 A1, EP 0,091,095 A). To obtain high energy density, an optimal ratio between heat transfer surface area and the storage volume is selected. The heat source in the longitudinal and transverse directions is arranged in such a way that the created material and temperature gradient are instantly balanced. However, it is unfavourable that a pronounced and not ultimate transition features in the dynamics of heat storage is observed during cyclic load exchange. Particularly during a scale enlargement in a geometrically intended main expansions, unwanted intermediate states arise in which the temperature change does not mainly take place in a gradual way due to disabled heat transfer and it is temporally and spatially blurred.

The disadvantages that arise in the case of mineral sorbents as a result of bad thermal conduction are already overcome through metallic ductile fill materials with larger dimensions. The fill materials usually consist of a principal framework (DE 100 21 260 A1) at which the boundary surfaces are found that are flow transparent and at the same time they are mutually connected at their edges. The surfaces are good heat conducting, whereby the partially opened bodies do not fall spatially into one another. The ductility of the fill materials and also its casing (DE 100 21 260 A1) ensures a dense packing of individual elements in the reaction zone and the better development of the majority of heat-transferring contact surface areas in the space expansions of the heat storage.

Binder

The drawback of all these sorbents is that, they can be hardly integrated into a moulded body.

The binding agent that is at the beginning flow-resistance remains an important space-fill component of the moulded body, which decreases the efficiency of the sorbents by blocking the micro-pores and meso-pores.

Usually the use of already granulated or pelletted crystals with a binder leads to these disadvantages. In fact due to the larger geometrical dimensions of granules, larger gap volumes arise that are favourable for the flow channel because of lower pressure losses. But regarding lower packing density, it affects the economic efficiency of the device altogether unprofitably.

Also flow-resistance and hardenable binder were already enriched only in the permeable surface of sorbing moulded bodies in order to improve their surface and structural stability altogether. This can be achieved by means of force field processes such as through sedimentation or filtration (DE 103 01 099 A1). Molding preforms are used that are impregnated with the spatially unevenly distributed bulk of the binder and are thermally pre-hardened at low temperatures.

Material and energy exchange: There are already known sorbing moulded bodies, which are provided with fluid permeable casings made from ceramic or metallic materials for the purpose of the good mass or energy exchange through the walls that bounded them (EP 0 1 403 80 A).

During the heat storage by means of highly effective ALPO or SAPO that have higher hydrothermal stability a special binder is required, which hardens at low temperatures without considerably decreasing their sorption ability and they present in likely low proportion in the moulded body.

Regeneration

Although the adsorption of vaporous working medium on silica based storage material can take place desirably under normal temperature, an achievable complete desorption and a targeted high degree of restoration of cyclic working capacity must be intended at higher temperatures usually of approximately 500° C. for the active components of the sorbing moulded bodies. The considerable charging and thus the temperature changes affect permanently the durable integration of powders or granulates into the porous moulded bodies. Since internal defects arise through tensions which are caused by heat changes, the moulded bodies must exhibit a high stability. These must be trapped by the stabilized walls for the sake of longer durability of the moulded bodies. Thus, the enhancement of the heat and/or cold storage is intended through the increment of the sorption capacity and the rise of the energy density also under improved mechanical characteristics of the moulded bodies.

The bad thermal conduction remains still unfavourable in particular for larger moulded bodies, since they are predominantly made up of mineral components as an insulant-like materials.

Task Setting

Therefore, the basic task of the invention is to eliminate the mentioned mechanical structure like heat and flow technical disadvantages of the described solutions of sorbing moulded bodies, whereby for sorbents with improved efficiency an improved heat guidance is also to be considered.

Constitution of the Moulded Bodies:

The task is solved by a moulded body, which possesses a metallic grid network-like cage structure and an internal likewise net-like heat conducting surface. The conducting surface according to the invention is a means for the better passage of heat flows and for the increment of stability as well as the shape of the moulded body.

From geometrical point of view, the conducting surface is formed from laterally expanded and between edges stretched produced guidelines of at least second order, which are bounded at the two transverse ends by second order curves. These edges represent circle, ellipse or parabola segments. The two bounds of the cage structure are connected, in each case in at least three upper points with a limiting edge as well as in three lower points with the second limiting edge of the conducting surface. In the longitudinal direction and thus the main expansion of the moulded body, the conducting surface exhibits the form of a spatially curved diagonal surface. The diagonal surface consists of two homogeneous parts, which are symmetrically reflected around the middle transverse axis in one of the transverse extensions.

From the physical point of view, the conducting surface represents a minimum surface in a cylindrical or rectangular body form for thermal conduction. Within the moulded body the conducting surface supports itself at the points of contact in an elastic way at the cage structure and it is optionally connected with the bounds of this structure.

With low expenses of material supply, an optimally high heat transfer character is adjusted within the moulded bodies and it is further send to their externally bounded cage structure. Altogether a sideway stable and proper heat conducting lattice structure develops within and outside of the moulded bodies.

The cage structure can consist of a woven fabrics, plaits or braids, knitted fabrics, or fibrous web or clutch that are preferably lattice-like or net-like and are metallic. In addition, the structure is at least single layer and can be implemented roughly by windings into multiple layers.

The heat carrier pipes can be thereby conventional pipes; they can also be a specially made pipes that make possible a better flow and heat transfer within the heat storage. In this way the pipes can be a so-called indented pipes, by which in their inside a highly turbulent flow is created with the working medium so as to make an improved heat transfer over the walls of the tube be possible. A similar effect is obtained by a sintered pipes, which exhibit roughness in their inside wall. Also the moulded bodies can be modified into disc-like objects, that connect flow technically related pipes with one another analogous to heating systems. In this way roughly parallel arranged or meandered pipes can be connected with one another over the damper for the inlet and outlet of the heat carrier medium.

Highly active sorbent is found within the cage structure with the conducting surface in form of agglomerate crystals or palletised granules, which are fused with one another through the binder in form of a random bed.

The geometrical boundary of the moulded bodies can be barrel-shaped, cylindrical, prismatic or polyhedral. The cage structure with the conducting surface and with the internal available powders or granules is partially deformable at least during its production process. These fulfil preferably the structural conditions of a rectangular or triangular pitch configuration of the internal heat directing devices on the bottom reflectors of the heat storage. They get closer in their form to the peripheries of the heat carrier pipes like in any case at individual points of contacts.

The flow of the working medium takes place in cavities preferably in the form of a compartment or wedged shaped inter-particle spaces or also over the tolerance gap that is developed between the moulded bodies and the heat carrier pipes. The material exchange of the moulded bodies takes place mainly over its front side and lateral surface. The heat exchange takes place over the cage structure connected with the conducting surface and with the neighbouring heat carrier pipes. Due to the high affinity of the sorbents to the vaporous working medium and consequently to high impulse forces of the sorption process, sufficient free cross sections are adjusted in all cavities for the flow of the working medium.

The external geometrical dimensions of the moulded bodies exceed significantly the size of the granules. Accordingly, high bulk density and higher space utilisation rate are adjusted for the sorbents in heat storage. The mesh sizes of the cage structure are however smaller than the main dimensions of the granulated sorbent bodies. For the purpose of the passage of the vapour of the working medium, during the application of powders in the moulded bodies, the mesh size of the cage is defined merely on a minimum required quantity. The mesh size of the conducting surface exceeds the size of the powders and can also exceed the size of the granules and it shall allow unrestricted flow of the moulded bodies in the preferred direction.

It is appropriate to combine the interior of the sorbent with special flow channels. These facilitate the admission of the working medium into the spaces of the moulded bodies, which lies suitably towards its main dimension but yet outside the sorption front. Altogether such a proportional cross flow of the working medium is achieved, which get into the heat storage over both the front surfaces and also over the lateral surfaces of the moulded bodies.

Methods for Production:

The lattice cage of the moulded bodies is pre-fabricated through rolling a smooth preferentially metallic network or from another wired and sharp mold-carrier. The network of the mold-carrier can also be a woven fabrics, plaits or braid, knitted fabric, or fibrous web. It is a netlike stocking material that is suitably cut into lengths. The conducting surface that is brought into the mold-carrier is plugged, stapled, sewed or simply attached to the bounds of the cage. The applied and those particles inserted into the moulded bodies are alumino-silicate powders or pre-moulded sorbing granules. They exist in a sphere, cylinder, barrel or other forms deviating from these prism geometry that preferentially refers to ALPO, SAPO and MeAPO.

The pre-fabrication of the moulded bodies takes place by pre-mixing the mineral powder and/or the pre-moulded granules with low viscous fluidic binders or from its moderately viscous or pasty components and the mixture is filled into the cage with the conducting surface. The fluidic viscous binder penetrates initially the entire gap volume. The binder should be enriched preferentially at the peripheral zone of the moulded bodies in order to ensure the entrance of the working medium through micro-pores and meso-pores with only low inhibitions for diffusion. Thus, the portion of the binder in the interior remains low and reduced on a required degree. As a function of the dimensions of the sorbening particles, the fill can take place through pressing with the help of a plunger or a piston movement of one or suitably from both transversally expanded boundary surfaces of the moulded bodies.

Familiar binders are preferably used, which are at low temperatures pre-dryable and hardenable. These are usually pre-polymer of alkaline silicates such as water-glass or silicon-organic viscous pasting agent like silicone. Phenol formaldehyde resins, polyvinyl resins and polyacrylates, with only slightly intended low internal binding firmness for the sorbents, can serve as additional binders. Also polyurethane and lattices increase the firmness within the moulded bodies only moderately. Cellulose derivatives as matrix creators for powders and granules are only temporarily available, during the pre-solidification process in the moulded bodies remained binders, and they can be partly removed by extraction again. Thereby, the undesired blocking of the micro-pores and meso-pores in the sorbents by the binder remains to a large extent reduced.

A chemical treatment of the binder can be caused by the introduction of additional adhesive and solidifying, however fluidic chemically reacting materials, into the components of the moulded bodies during the partial elimination of the binder. This can be occurred by means of acids or bases for water-glass containing binder, which accelerate the polymerisation and condensation of the available silicate functional groups. With other silicates and hardenable binders this can be caused by adding reactive fluidic components for the development of the pre-polymers.

In the wall-bounds the binder is locally restricted and is applied preferentially in higher proportions, where it is essential for the maintenance of the structure stability of the moulded bodies and thus for its structure-forming effect. Due to higher temperature resistance, in these bounds common inorganic binders are used preferentially like aluminium hydroxide hydrates, clays and silica gel. Likewise embedding can take place in a matrices made of silicic acid or aluminiumoxid hydrate as well as in bentonite and special clays like metakaolinite. Also a carbonation of the particles embedder and originally water-soluble pitch acid is possible.

Fluidic binders are brought into the wall-bounds by means of infiltration, whereas pasty ones if necessary through overpressure and under creation of a pressure cushion within a press rooms to one or both of the transversal bounding surfaces. The binder is enriched thereby in a relatively thin layer and penetrates into the regions with higher boundary surface forces and thus adhesive force, particularly during application of granules. It adheres preferentially to the points of contact of the crystals and granules and fills only partially the interiors of the moulded bodies and the vacant spaces that are necessary for the mass transfer between solid components. Moderately pasty binders are already applied during the pre-fabrication on the lattice structure of the moulded bodies and under pressure they are pressed into the exterior surfaces.

A stepwise or sudden distribution that is forwarded into the interior is adjusted by means of binders of the moulded bodies present between the granules prior to or during the structural solidification. This can be caused when in the core zones of the moulded bodies lower proportion of the first binder exists. However in the auxiliary lying peripheral zone, higher portions of a second binder can be accessible.

The moulded body is pre-solidified under heating through compression of the lattice cage together with the sorbents. Thereby those which are stated under heat input, at least two layer die stocks, heat up also the lattice cage of the moulded bodies, whereby over the conducting surface at the same time a distinctive good heat entrance is made into its inside under intensive heat balance for the purpose of binder drying process. It is also possible to put and compress the lattice structure in addition together with the binder on the moulded bodies. It follows a post-drying with increased temperatures and/or also activation of the moulded bodies. This can take place in a suitable gas atmosphere. All moulding processes associated with heat balance take place due to improved thermal conduction even with larger dimensions of the moulded bodies within reduced periods of times compared with those conventionally manufactured moulded bodies without conducting surface.

A stable and highly mechanically resistant coating region develops in the wall-bounds of the sorbing moulded bodies, which is arranged toward the original pressing effect. However, in the central and axial neighbouring regions the binder portion is reduced.

In the modification of the moulded bodies fine fibrous and/or fine dispersed metal components with dimension in millimeter region are also additionally available in its interior for the purpose of improved thermal conduction. This is above the size of the silicalite crystal, however below the basic dimension of the granules and proportionally in contact with the conducting surface of the moulded bodies. Where appropriate deformed stripe-, fibre- or film-like components of metals or other heat-conductive materials, whose basic dimensions lie above those of the granules, can also be introduced. Further components of the moulded bodies are the portion of the wetting agents and adhesion mediator for the components of the moulded bodies between the sorbing particles.

Since the pre-solidification of the binder takes place under simultaneous pre-heating of the pre-form and the corresponding pre-heating temperatures for water-glass containing binders lies below 200° C. preferentially 150° C., there is no damage to expect in particular for alumino-phosphates, silico-alumo-phosphates or metallo-alumo-silicates. Temperatures between 400° C. and 600° C. in an inert gas conditions is favourably used to bake and activate that similarly does not lead to structural changes.

Particularly favourable effects are obtained by the fact that the active components of the sorbing moulded bodies in contrast to the state of the art do not or insignificantly change their lattice structure at higher temperatures during the charging and discharging heat storage processes, so that a long durability of the moulded bodies and an improved effectiveness at the same time enhanced life time is attained.

The characteristic features of the invention are derived from the elements of the claims and the stated descriptions. Both the single and a combination of several of these features represent a favourable method for which a protection is applied through this publication.

The nature of the invention consists of a combination of known (moulded bodies made of powders and/or granules, binding agents, etc.) and new elements (the production of the moulded bodies by means of a cage and conducting surface), which influence mutually and show new entire positive effect on their application and the strived success to achieve higher space-time yields while storing process heat and cold than the state of the art.

The advantages of the inventive sorbent moulded body is thus an optimal as well as possible co-actions of heat directing and the reaction technical efficiency of alumino-phosphates, silico-alumo-phosphates or metallo-alumo-silicates as well as in their flow-technical action during the material and heat exchange so as to achieve high space-time yields while storing process heat and cold.

The method is not limited only on the production of sorbent moulded bodies. Other moulded bodies, for instance those containing non-adsorbing granules can be produced in the same or similar manner through infiltration within a lattice structure. In this way a sinter-like fused moulded bodies are developed from the coarse dispersed granules that are characterized favourably by lower proportion of binder and higher gap volumes, whereby the walls are strengthened by higher proportion of the solidifying binding agents.

BRIEF DESCRIPTION OF THE DRAWINGS

The invention is described in detail, without being limited to the reference examples. The corresponding drawings show:

FIG. 3: A heat carrier pipe with neighbouring moulded bodies in schematic representation FIG. 4 (a) and FIG. 4 (b): Embodiment of the cage lattice structure in rectangular and triangular compartment FIG. 5 (a) and FIG. 5 (b): consecutively arranged moulded bodies in charged with a bottom mirror of a heat storage in rectangular and triangular compartment.

DETAILED DESCRIPTION OF THE INVENTION

Example 1

Figure 1:
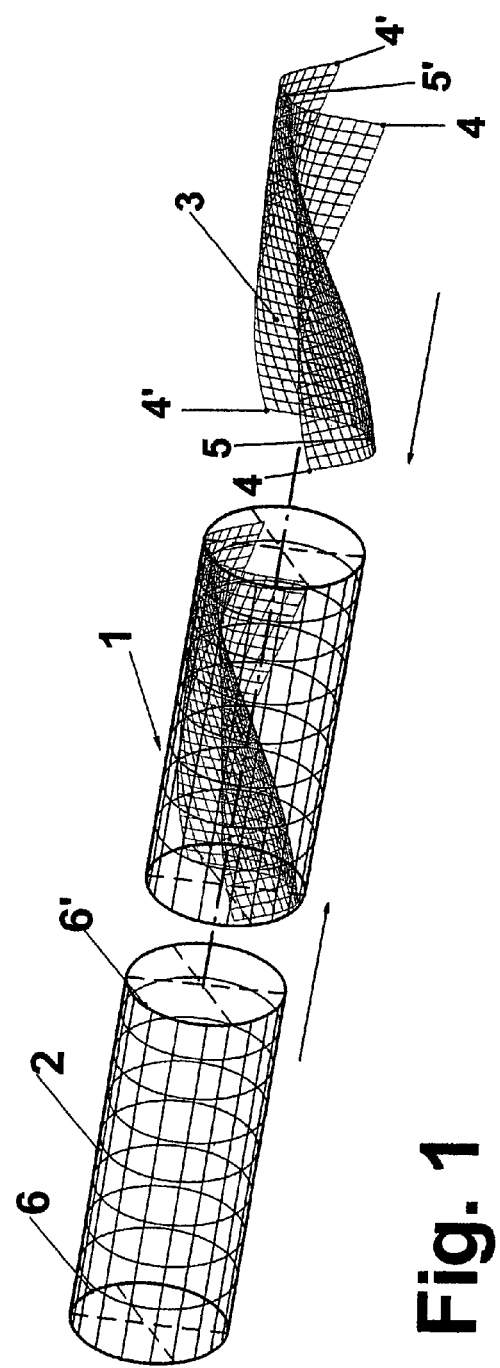
FIG. 1: The sorbtion moulded bodies with cage and conducting surface in an exploded view FIG. 2 (a) to FIG. 2 (d): Embodiment of different moulded bodies with flow channels in the diagonal direction on the conducting surface
Figure 2:
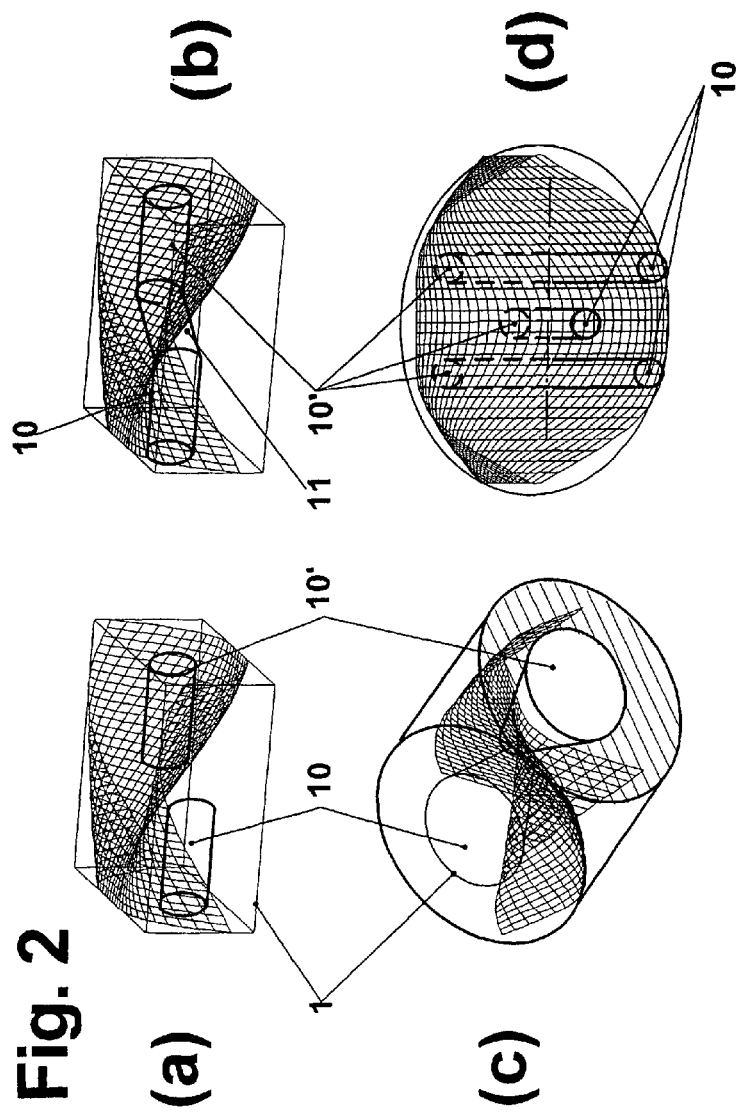

The state of the art of sorbtion cylindrical moulded body (1) according to FIG. 1 is characterised by the absence of at least one conducting surface (3) in cage (2) between powders or granules of the sorbents (7) with possibly additionally inserted heat conducting solid material and a further homogeneous distribution of the binder still exists. Thereby, gaps can also be developed before or during the hardening process of the binder that are interspersed from the vaporous working medium. According to the state of the art, these gaps are still present inconveniently in low proportion and extent. Also they form only reduced transport pores, so that a possible flowable gap volumes remain limited as a result of a high proportion of the binding agent. The heat balance with a metallic and transparent coating is yet to be achieved.

According to the state of the art inappropriate with DE 103 01 099 A1, to realise the associated method for production by means of force field processes a concentration of the binder is adjusted according to an exponential distribution over a transverse direction of the moulded bodies (1). This results in stabilization and hardening of the coating in the peripheral regions. On the other hand within axially neighbouring and central regions of the moulded body (1), a depletion of the binder occurs. However, the binder adheres preferentially at the dense adjoined granules and other inserted solid materials as well as in the wedged shaped inter-particle spaces in such a way that larger free spaces be developed around the inter-particle space, larger transport pores and altogether larger and freely flowable gap volumes arise. However, the heat balance with the metallic coating is at this point still unsatisfactory due to the absence of conducting surfaces.

Example 2

According to the invention with reference to FIG. 1, the moulded body (1) is consisted of cage (2) and transparent conducting surface (3). The burr (4) and burr (4') as well as the bottom plate (5) are on one side connected with a lower part of the bound (6) of one of the transversal bounding surfaces the burr (4) and the burr (4') with the peak (5') and with a top of the other transversal bounding surfaces (6') at the cage (2) of the moulded body (1). In accordance with FIG. 4, the moulded body (1) placed itself over the tolerance gap (22) at four heat carrier pipes (20) (FIG. 4 a) and/or three heat carrier pipes (20) (FIG. 4 b).

According to FIG. 3, the wall temperature of the heat carrier pipe (20) still exceeds above the base (21) during heat input under yet fixed time conditions that was determined for those without the conducting surface (3) (LF) and those which are not filled with the sorbents (7).

Alumosilicate with pore volume of 0.3-0.4 cm3/g and an average pore diameter of 7.4 Å in moulded body with main dimension of 300 mm Ø×400 mm serves as sorbents. According to the state of the art, at the beginning (20 s) heat balance, the wall temperature exceeds around 1.5 times that of the moulded body's.

Example 3

In a moulded body in accordance with example 2, there exists one alumosilicate in the form of hollow cylinder with a dimension 6/3 and/or as sorbents 7/4 mm of initial bulk density of 400-550 m3/kg and a specific surface area that is higher than 700 m3/kg.

The increment of relative mass of the water-glass in the binder with a relative radius 0.9 (relative to the distance between the centre of the axis and the periphery of the sorbent moulded body) amounts to a maximum of 8%, whereas it is a maximum of 2% for a relative radius of 0.1. The increase of the relative coefficients of resistance and the relative gap volume (relative to the state of the art moulded body) shows depending on the cross section related average relative speed of the vaporous working medium with an increase of this speed to about 100% a maximum of 6% degradation of the relative coefficient of resistance and a maximum of 9% increase of the relative gap volume.

Example 4

Moulded body (1) which is modified and applied in accordance with FIG. 4 and example 3 respectively contains in sorbents (7) on one side to each other reflecting both sides of the conducting surface (3) and a flow channel (10') on the other side a flow channel (10). According to FIG. 4 (a), the flow channels (10) and (10') possess a cylindrical form. Through mass and heat balance after a process time of 144 s, 90% of equilibrium is attained for the vapours working medium and for the adjusted temperature lift.

Example 5

A moulded body according to FIG. 4 (b) possesses between the flow channels (10); (10') a passage (11) for the working medium. In accordance with example 4 and considering a process time of 160 s, a 90% of equilibrium is attained for the vaporous working medium and the adjusted temperature lift.

Example 6

Moulded body (1) according to FIG. 4 (c) possesses as a flow channels 10; 10' two conical press pieces that lie opposite to each other. According to the examples 2 and 4 an equilibrium is attained after 118 s.

Example 7

Moulded body 1 according to FIG. 4 (d) possesses three channels, which in turn each made of flow channels 10, 10' with entrance 11. According to the aforesaid examples, appropriate adjustment of the water vapor and temperature equilibrium are attained comparable to example 5 after 120 s.

Example 8

According to FIG. 5, on the bottom 21 of heat storage between the heat carrier pipe 20, there are several moulded bodies 1 and 1' each in their cage 2 and 2' arranged in a rectangular partition FIG. 5 (a)] or in a triangular partition FIG. 5 (b)] of the bottom 21. The moulded bodies 1 and 1' do not possess flow channels 10, 10' and also entrance 11.

In an experimental setup of the heat storage according to FIG. 5 (a) and in accordance with example 2, water vapor and temperature equilibrium are attained after approximately 6 minutes with 6 moulded bodies in the linear extension and 4 moulded bodies with dimensions in one of the transverse extensions under conditions corresponding their outlet.

Example 9

According to the table 1 the work capacities (load capacity as differences of the sorption capacity) as measured data of conventional sorbents and two here applied sorbents are compared with one another under comparable sorption temperatures of adsorption and desorption. Under the reversibility of both processes the work capacities of the SAPO and ALPO are approximately increased by the factor of 4 to 6. As with reference to example 10 and table 2, the energy density of the heat storage apparatus increases with 30 to 40% under the same apparatus setup.

TABLE 1

Comparison of work capacities of the invented moulded bodiess with the state of the art.

| Sorbents | work capacity, Δa [kg/kg] | Adsorption and desorption temperature, T [K] |
| --- | --- | --- |
| State of the art (Silica gel A) | 0.04 | $T_{des} = 303$ |
| State of the art (Silica gel A) | 0.03 | $T_{des} = 363$ |
| SAPO - X2 | 0.19 | $T_{ads} = 313$ |
| ALPO - X1 | 0.16 | $T_{ads} = 363$ |

Example 10

With reference to table 2, some measured values are shown for the description of the characteristics of applied sorbents (SAPO and ALPO) like that of water vapor sorption capacity, the integral molar heat of adsorption and the desorption temperature compared with those commercially available zeolite sorbents. This confirms that the adsorption capacities and integral heats of adsorption of SAPO and ALPO are now favorably higher and it is comparable with zeolites. In contrast to that, the desorption temperatures are comparatively low and lie at least 100° C. to 130° C. below the corresponding temperatures of zeolites.

TABLE 2

Comparison of aluminophosphates together with measured values for sorbents of the state of the art

| Sorbent Type | Commercial Name | Producer | Sorption Capacity a, [kg/kg] | Integral Heat of Adsorption Q, [kJ/mol], | Energy Density W, [kW/kg] | Desorption Temperature $T_{des}$, [K] |
|---|---|---|---|---|---|---|
| Zeolite | Baylith | Bayer AG | 0.266 | 76.8 | 0.261 | ca. 500 |
| NaCaA | KE 154 | Leverkusen | 0.285 | 52.5 | 0.229 | |
| NaX | WE 894 | | | | | |
| NaX | Zeosorb 13X | Bayer AG | 0.231 | 48.4 | 0.199 | 605 |
| NaA | Zeosorb 4A | Bitterfeld - Wolfen | 0.201 | 56.0 | 0.146 | 640 |
| NaCaA | S 114 P | modified | 0.291 | 73.4 | 0.342 | ~<600 |
| NaX | PS 107 | commercial | 0.352 | 72.3 | 0.386 | 580 |
| NaX | PS 102 F | zeolites | 0.316 | 74.0 | 0.351 | ~>600 |
| NaA | S 166 | | 0.294 | 71.0 | 0.310 | ~=600 |
| The applied SAPO and ALPO | SAPO-34 | commercially not available | 0.279 | 54.8 | 0.41 | 559 |
| | ALPO-5 | | 0.237 | 53.4 | 0.46 | 377 |
| | ALPO-17 | | 0.283 | 55.4 | 0.43 | <400 |
| | ALPO-18 | | 0.388 | 55.4 | 0.49 | 403 |

The invention claimed is:

1. A moulded body comprising crystalline powder and/or granules; at least one binder binding the powder and/or granules; a net-like cage for receiving said powder and/or granules and said at least one binder; and a lattice structure within and connected to the cage; wherein the lattice structure has mesh-like openings larger than a largest dimension of exemplary individual unit structures of said crystalline powder and/or granules; wherein the lattice structure is a heat conducting surface, and the powder and/or granules comprise sorption powder and/or granules, whereby the moulded body is a sorption moulded body.

2. The moulded body of claim 1, wherein the binder is unevenly distributed between peripheral radial and central axial parts of the moulded body.

3. Moulded body of claim 1, wherein the heat conducting surface comprises a pair of burrs between which a face of the lattice structure extends, the face being shaped as a peak proximate one extremity thereof and as a recess toward another extremity thereof, the peak and the recess being connected to respective opposed surfaces of the cage.

4. The moulded body of claim 1, wherein the cage and the lattice structure comprise metallic knitted or woven fabrics, braids or plaits, fleeces or fibrous webs.

5. The moulded body of claim 1, wherein the cage is at least a single layer.

6. The moulded body of claim 1, wherein in said cage are arranged mutually reflecting portions of the lattice structure and respective inlet and outlet flow channels.

7. The moulded body of claim 6, wherein said flow channels exhibit a cylindrical, cone or prism shape.

8. The moulded body of claim 6, wherein said flow channels are connected with each other by a passage channel.

9. The moulded body of claim 1, in combination with a base and three or four heat carrier pipes connected to the base and spaced from the moulded body by respective tolerance gaps.

10. The combination of claim 9, wherein a plurality of said moulded bodies are arranged one behind the other to form a linear structure and a plurality of said linear structures and said heat pipes are arranged mutually parallel.

11. The moulded body of claim 1, wherein the sorbents comprise aluminophosphates (ALPO), silico-alumino-phosphates (SAPO) or metallo-alumino-phosphates (MeAPO) sorbents, the lattice structure of which does not change at all or significantly during the exchange of the load by sorption at higher and lower temperatures.

12. The moulded body of claim 1, wherein the granules possess a sphere, cylinder, barrel or of polyhedron shape.

13. The moulded body of claim 1, further comprising heat conducting fine fibrous and/or fine dispersed metal components.

14. The moulded body of claim 1, further comprising deformed strip-, fibre- or film-shaped components of metals or other heat-conductive materials having a main dimension greater than the size of the granules.

15. The moulded body of claim 1, wherein said binder comprises pre-polymers of alkaline silicates or silicones or phenol formaldehyde resins or, polyvinyl or polyacrylates or polyurethanes or latexes.

16. The moulded body of claim 1, wherein the binder comprises a cellulose derivative which temporarily remains in the moulded body.

17. The moulded body of claim 1, wherein the binder comprises a water-glass.

18. The moulded body of claim 1, further comprising a second binder which is hardenable and pre-dryable at higher temperatures than the other binder and is and is selectively applied so that the second binder is in higher proportion in the wall bounds.

19. The moulded body of claim 1, wherein the binders comprise inorganic binders selected from the group consisting of alumina hydrate, metakaolinite, bentonite, imbedded matrices from silicic acid, and alumina hydrate.

20. The moulded body of claim 1, wherein the binder comprises a carbonated pitch acid.

21. Method for production of a moulded body of claim 1, comprising bringing together with a carrier-like transparent wall having a surface in a form of a spatially curved diagonal area firm and pre-mixed portions of the moulded body with lower but still not yet solidified portions of the binder and adhesion mediators, whereby a random bed is built under lower solidification and under the presence of gap areas with lower portions of the binder and to be brought and pre-solidified under the effect of a predominantly radial pressure into a provisional form and, optionally, a second binder is inserted into peripheral-radial parts of the wall through radial and axial pressure, whereby a further solidification of the generally yet transparent wall of the moulded body is developed with an increased firmness and stability in form of a casing.

22. Method for production of a moulded body of claim 1, comprising the following steps: pre-fabricating a lattice structure comprising an assembly of the cage with the conducting surface, creating a pre-mold through fluidic and/or pasty components of the binder with firm components as well as lesser proportions of auxiliary reactive adhesion mediators into a hollow of a tool comprising the hollow tool, the hollow having perforated walls through which pressure can be applied, injecting the pre-mold in one of the transverse directions through simultaneous pressing of flow channels by means of a casts in a longitudinal direction, under penetration of the conducting surface and, either one of simultaneously or following thermal pre-treatment at temperatures of 150° C. to 200° C. to a mold product, completing the mold that is detached from the hollow by thermal subsequent treatment and activating at temperatures of 400° C. to 600° C., in an inert gas atmosphere.

23. Method for the production of a moulded body according to claim 22, further comprising, after the thermal pre-treatment and before the thermal subsequent treatment, applying a second pasty binder on the mold that is detached from the hollow and onto this arranging the pre-fabricated lattice structure or arranging the pre-fabricated lattice structure in the hollow and applying a second pasty binder on the mold that is removed from the hollow together with the lattice structure, under renewed pressing and redensification.

24. Method according to claim 22 wherein the binder comprises water-glass and an acid or base to accelerate a polymerization and a condensation of silicate functional groups.

25. Method according to claim 24, wherein a pre-solidification of the binder takes place under simultaneous pre-heating of the pre-mold at temperatures below 200° C.

26. Method according to claim 24, wherein a pre-solidification of the binder takes place under simultaneous pre-heating of the pre-mold at temperatures below 150° C.

27. Method according to claim 22, wherein the thermal subsequent treatment and activating is in an inert gas atmosphere.

28. A method comprising storing process heat and/or cold in the moulded body of claim 1.

29. The method according to claim 28, wherein a working medium comprising water vapor is expelled from the moulded body by introduction of heat energy.

30. The method according to claim 29, wherein the expelled working medium comprises water vapor and the method further comprises condensing the water vapor or adsorbing the water vapor.

31. The moulded body of claim 1, wherein the lattice structure is formed as a spatially curved diagonal surface having two homogenous symmetrically reflected parts about a transverse axis.

32. The moulded body of claim 31, wherein in a vicinity of one end of the cage, an edge of the lattice structure forms a first curve defining a peak in contact with the cage, and at a vicinity of another end of the cage, another edge of the lattice structure forms a second curve of opposite curvature as the first curve defining a valley in contact with the cage.

33. The moulded body of claim 32, wherein said first curve contacts the cage at two additional points away from the peak, and wherein said second curve contacts the cage at two additional points away from the valley.

34. A moulded body comprising: crystalline powder and/or granules; at least one binder binding the powder and/or granules; a net-like cage for receiving said powder and/or granules and said at least one binder; and a lattice structure within and connected to the cage; wherein the cage has two open ends; wherein the lattice structure has a first edge at a first of said open ends and a second edge at a second of the open ends; said first edge defining a second order curve with a peak and two end points, said peak and two end points being in contact with the cage; said second edge defining a second order curve, which is a symmetrical reflection of the first curve, with a valley and two end points, said second curve's valley and two end points being in contact with the cage; wherein the lattice structure is a heat conducting surface, and the powder and/or granules comprise sorption powder and/or granules, whereby the moulded body is a sorption moulded body.

* * * * *